(No Model.) 3 Sheets—Sheet 1.
F. H. SANDERSON.
PHOTOGRAPHIC CAMERA.
No. 570,774. Patented Nov. 3, 1896.
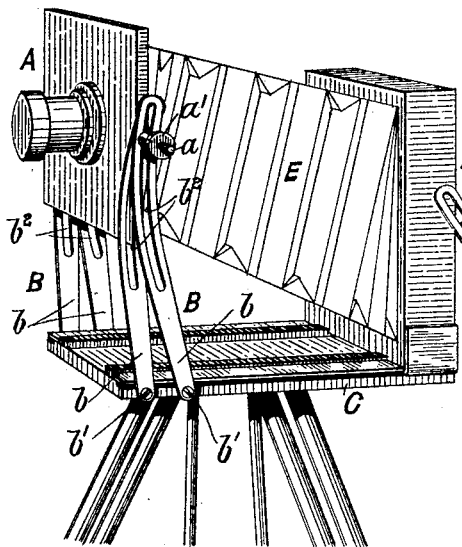
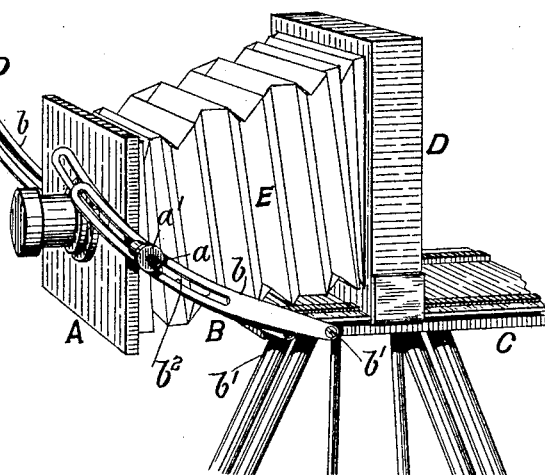
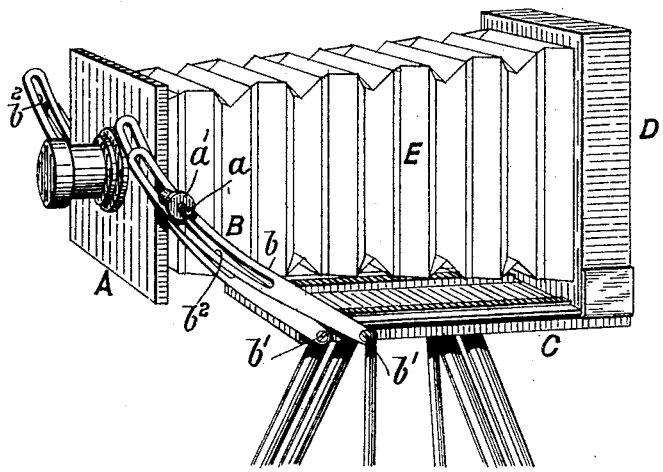
WITNESSES.
INVENTOR:
F. H. Sanderson
BY
Munn & Co
ATTORNEYS (No Model.)
F. H. SANDERSON.
PHOTOGRAPHIC CAMERA.
No. 570,774.                    Patented Nov. 3, 1896.
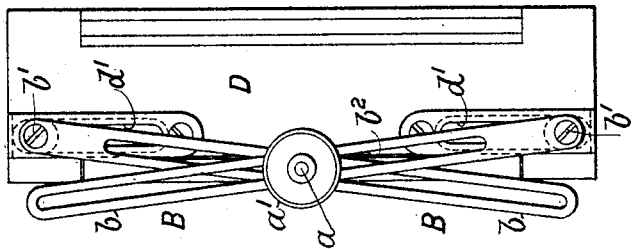
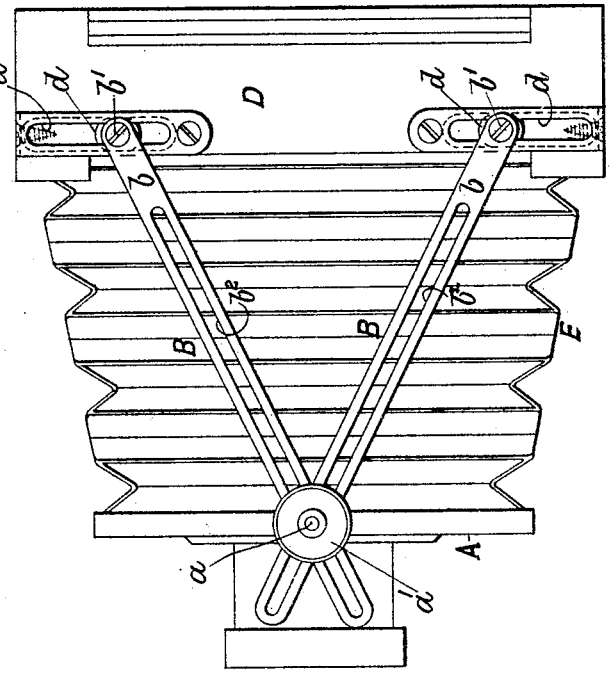
WITNESSES.
INVENTOR:
F. H. Sanderson
BY
Munn & Co
ATTORNEYS

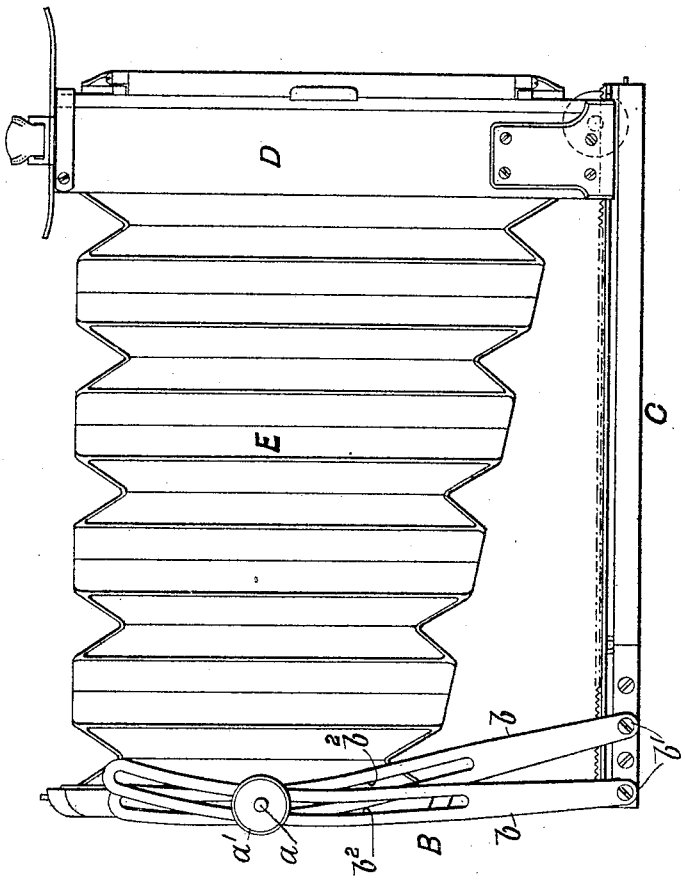

UNITED STATES PATENT OFFICE.

FREDERICK HERBERT SANDERSON, OF CAMBRIDGE, ENGLAND.

PHOTOGRAPHIC CAMERA.

SPECIFICATION forming part of Letters Patent No. 570,774, dated November 3, 1896.

Application filed October 22, 1895. Serial No. 566,481. (No model.)

*To all whom it may concern:*

Be it known that I, FREDERICK HERBERT SANDERSON, of 48 Bridge Street, Cambridge, in the county of Cambridge, England, have invented a new and useful Improvement in Photographic Cameras, of which the following is a full, clear, and exact description.

This invention relates to improved means of supporting the lens-carrying front of a bellows-body photographic camera, whereby such an adjustment of the lens is rendered possible by a single motion of the supports that the picture may be roughly focused and the lens may at the same time be raised or lowered, so as to include as much of the subject or foreground as may be required, while the use of a swing-back is rendered unnecessary in order to maintain the verticality of the upright lines of an architectural or similar subject.

Reference is to be had to the accompanying drawings, forming part of this specification, wherein—

Figure 1 shows the camera-front supported at the full extension of the body, while Figs. 2 and 3 illustrate the extreme ranges of adjustment of the lens above or below the level of the center of the plate. Figs. 4 and 5 are side views in the closed and open position, respectively, of a camera in which the cantalivers are pivoted to the camera-back. Fig. 6 is a side elevation of the camera illustrated in Figs. 1 to 3, drawn to a larger scale, showing the tapering form of the bellows-body.

Similar letters of reference denote like parts in all the figures.

Referring to Figs. 1, 2, and 3, A is the camera-front, upon which the lens is mounted in the usual manner, and B B are the two swinging arms or cantalivers, each formed of two members $b$, pivoted on studs $b'$, situated at a distance apart, the two members being in slightly-different planes, so as to cross each other, and the pivot-studs being mounted on a suitable support, such as the base-board C. The members $b$ (which are shown as slightly curved, but may be straight) have longitudinal slots $b^2$, in which are received the side gudgeons $a$, fixed to the edges of the front A, each gudgeon passing through the slots $b^2$ of both members $b$ at the point where they cross each other and being threaded to receive a milled nut $a'$, by tightening which the members $b$ are clamped rigidly together and to the edge of the front A, which is thus firmly supported at the required height in a vertical or inclined position.

It will be understood that the front A, carrying the objective or lens, can be turned about a horizontal axis after loosening the nut $a'$. Thus I obtain the same effect as with the well-known swing-back.

The adjustment is effected by slacking the two nuts $a'$ and sliding the gudgeons $a$ up or down, at the same time swinging the two pairs of members B upon their pivots, whereby the picture is roughly focused and the lens raised or lowered, as required, by one and the same action. When the arms are swung forward, as shown in Fig. 1, they may be said to act as cantalivers, overhanging the front end of the base-board C and supporting the front A in advance thereof at the full extent of the body E, so that no sliding extension-frame of the base-board is required for ordinary purposes, although it may be adopted when extra extension is necessary.

The base-board C is provided with the usual guides and focusing rack motion for adjusting the back part D of the camera-body. The bellows-body E is of dissymmetrical form, as shown more clearly in Fig. 6, being made tapering on the lower side to permit of the lowering of the front to the position shown in Fig. 3, while the upper side of the body is of uniform height or horizontal throughout its length when the top and bottom plaits are equally expanded, so that when the front is raised to its full extent, as in Fig. 2, while the body E is only partly extended, the top of the body will not be liable to sag and so cut off part of the picture.

Figs. 4 and 5 show a pocket-camera having no base-board and in which the cantaliver-arms are pivoted to the back D of the camera-body as their point of support, the arms in this case projecting forward from the back D at either side of the bellows-body. The pivotal studs $b'$ may either be fixed directly to the sides of the body D or preferably carried by slide-blocks $d$, fitted to slide in vertical guide-grooves $d'$ in the sides of the body to admit of the studs $b'$ approaching each other slightly when the camera is extended, as in Fig. 5, and receding when the camera is collapsed, as in Fig. 4.

I claim—

1. The combination, with a camera-front having side gudgeons, of a pair of swinging arms or cantalivers each formed of two longitudinally-slotted members whose ends are respectively pivoted at a distance apart to a suitable support, the two slotted members crossing each other and the corresponding gudgeon passing through the slots of both members at their crossing-point said gudgeon having pivotal engagement with both of the slotted members and being secured thereto by a binding-nut whereby the camera-front is supported wholly by the said arms and can be adjusted in the fore-and-aft and up-and-down directions and likewise about a horizontal axis, substantially as specified.

2. The combination with a fixed camera-bed, and a camera thereon, of two pairs of longitudinally-slotted arms, one pair on each side of the camera, each pair of arms being pivoted to the front of the camera-bed at a distance apart, and clamping-pivots for adjustably securing the arms to the camera-front, said pivots being secured to opposite sides of the camera-front and each projecting through the slots of a pair of the arms, whereby the camera-front will be supported wholly by the said arms, can be adjusted up or down, and extended beyond the camera-bed, substantially as described.

3. The combination with a fixed camera-bed, and a camera thereon, of two pairs of longitudinally-slotted and curved arms, one pair on each side of the camera, each pair of arms being pivoted to the front of the camera-bed at a distance apart, screw-threaded pivots on opposite sides of the camera-front and each projecting through the slots of a pair of the said arms, and nuts on the said pivots, substantially as herein shown and described.

FREDERICK HERBERT SANDERSON.

In presence of—
FREDK. WM. TURNER,
ERNEST CATOR.